US012202104B2

(12) United States Patent
Benton

(10) Patent No.: US 12,202,104 B2
(45) Date of Patent: Jan. 21, 2025

(54) GRIP SOCKET DEVICE

(71) Applicant: Joaquin Benton, Saratoga Springs, NY (US)

(72) Inventor: Joaquin Benton, Saratoga Springs, NY (US)

( * ) Notice: Subject to any disclaimer, the term of this patent is extended or adjusted under 35 U.S.C. 154(b) by 273 days.

(21) Appl. No.: 17/885,769

(22) Filed: Aug. 11, 2022

(65) Prior Publication Data

US 2024/0051097 A1 Feb. 15, 2024

(51) Int. Cl.
*B25B 23/10* (2006.01)
*B25B 13/06* (2006.01)

(52) U.S. Cl.
CPC ............ *B25B 23/108* (2013.01); *B25B 13/06* (2013.01)

(58) Field of Classification Search
CPC ....... B25B 13/06; B25B 13/107; B25B 13/56; B25B 13/58; B25B 23/0035; B25B 23/08; B25B 23/10; B25B 23/108; B25B 27/18
See application file for complete search history.

(56) References Cited

U.S. PATENT DOCUMENTS 4,856,386 A * 8/1989 Rodriguez .............. B25B 13/44 81/53.2
5,315,902 A * 5/1994 Ragland .............. B25B 13/5016 81/53.2
6,073,520 A * 6/2000 Bueno ..................... B25B 13/44 81/53.2
7,765,898 B2 * 8/2010 Sakaguchi .......... B25B 23/0035 81/125
2015/0224633 A1 * 8/2015 Alavi .................... B25B 23/108 81/125

* cited by examiner

*Primary Examiner* — Robert J Scruggs
(74) *Attorney, Agent, or Firm* — Adrienne Love

(57) ABSTRACT

A grip socket device for use in a modified socket is disclosed to better grip an object, such as a nut or bolt. The grip socket device has a locking tool configured to engage with a modified socket having a groove, a series of rod members extending away from the locking tool and a series of grip pads attached to the series of rod members. Grip pads have a plurality of teeth that are used to engage with a prior art object placed within the modified socket.

14 Claims, 13 Drawing Sheets

GRIP SOCKET DEVICE

BACKGROUND OF THE INVENTION

1. Field of the Invention

This invention relates to the field of devices made for turning a fastener, typically in the form of a nut or bolt. More specifically, the invention comprises a socket wrench for gripping and turning a nut or bolt, especially one with worn or round edges.

2. Description of the Related Art

A socket wrench is a type of wrench that uses a closed socket(s) format to turn a nut or bolt. The most common type of socket wrench is a ratcheting socket wrench with interchangeable sockets. A prior art ratcheting socket wrench is shown in FIG. 1. The wrench 10 has a handle 12, with a plastic or rubberized grip that fits over handle. Wrench 10 has a hole 14 at one end designed to hang the wrench for storage. At another end, wrench 10 has head 16 and ratcheting mechanism 22 which allows a nut to be tightened or loosened when handle is moved clockwise and counterclockwise in a reciprocating motion. A standard ratcheting mechanism 22 is made up of socket 20 and adapter 18. Adapter 18 has a square fitting to correspond with the square opening on socket 20. Socket 20 is shown in FIG. 2. Socket 20 can be many different sizes to correspond with different nuts and bolts. Socket 20 typically has a hexagon shape on its interior surface 23. Interior surface 23 has six lobes 24 and six depressions 26. Additionally, in FIG. 3, a section view of socket 20 is shown where interior surface 23 of socket 20 includes lobes 24 and depressions 26. Although socket 20 comes in many various sizes and lengths, a problem is presented when a bolt or nut is damaged or worn. The socket 20 may not garner enough grip to turn the damaged or worn bolt or nut, due to the rounded surfaces of the outer edge of the bolt or nut.

Therefore, what is needed is a grip socket device that allows for a sturdier grip on a worn or damaged bolt or nut. Additionally, the grip socket device should be capable of converting an existing socket to have a better grip a bolt or nut. The present invention achieves this objective, as well as others that are explained in the following description.

BRIEF SUMMARY OF THE INVENTION

The present comprises a grip socket device for installation on a modified socket. Grip socket device has a series of rod members attached to a locking tool at one end and a grip pad at another end. Locking tool is designed to expand or contract for ease of installation into a groove on socket. Once aligned with the groove on socket, locking tool expands and locks into place by frictional engagement with the walls of groove. Each rod member fits loosely into depressions on modified socket. Outer surface of grip pad rests along interior surface of socket roughly aligned with depressions within modified socket. Opposite outer surface is a gripping surface which faces toward the interior of socket. Gripping surface is designed to increase frictional engagement with an object, such as a nut or bolt. Grip socket device thereby provides a secure frictional engagement with an object. Additionally, the secure gripping surface prevents or reduces damage to objects by providing a secure gripping surface to disengage nuts and bolts.

REFERENCE NUMERALS IN THE DRAWINGS

Figure 1:
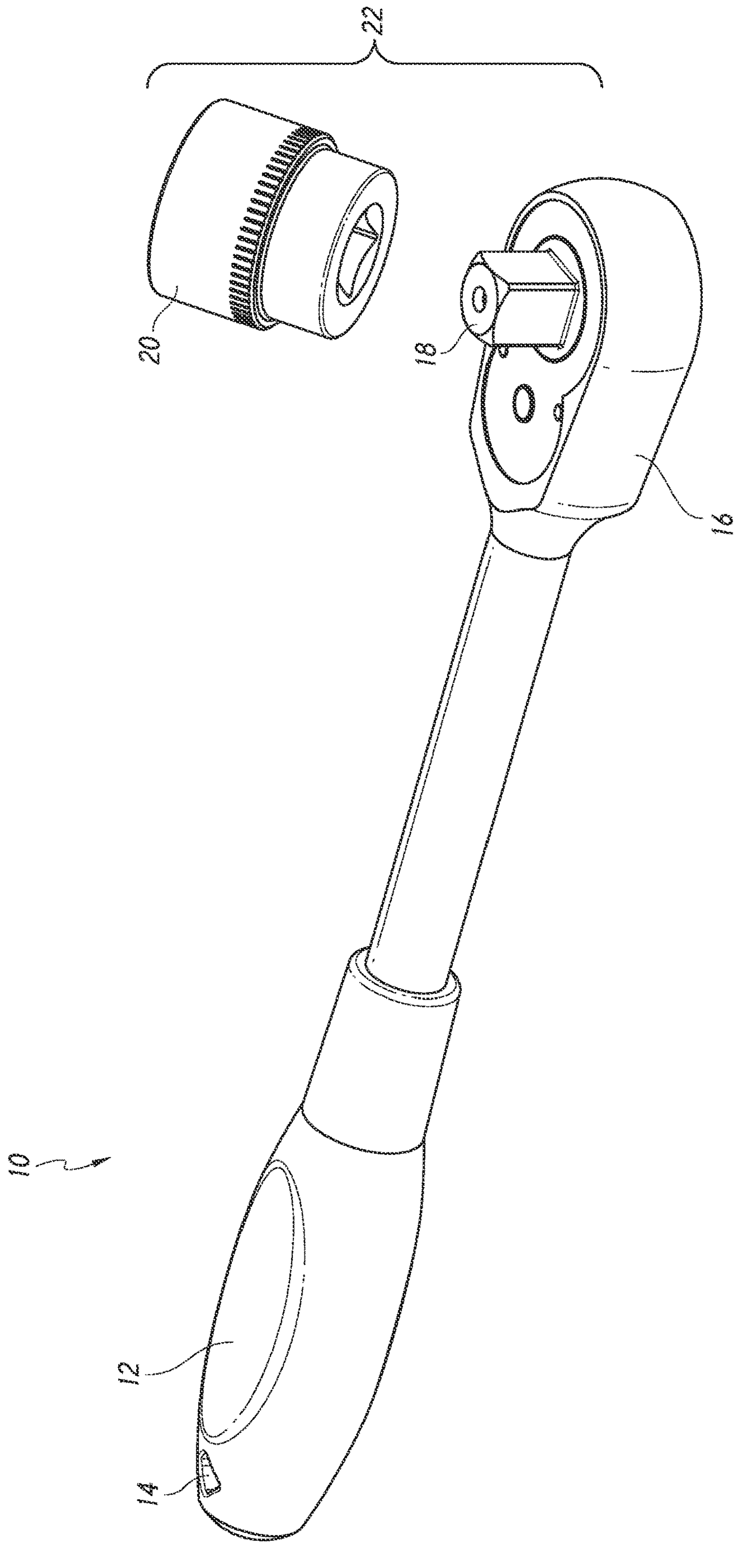
FIG. 1 (PRIOR ART)
FIG. 1 is a perspective view, showing a prior art socket wrench.
Figure 2:
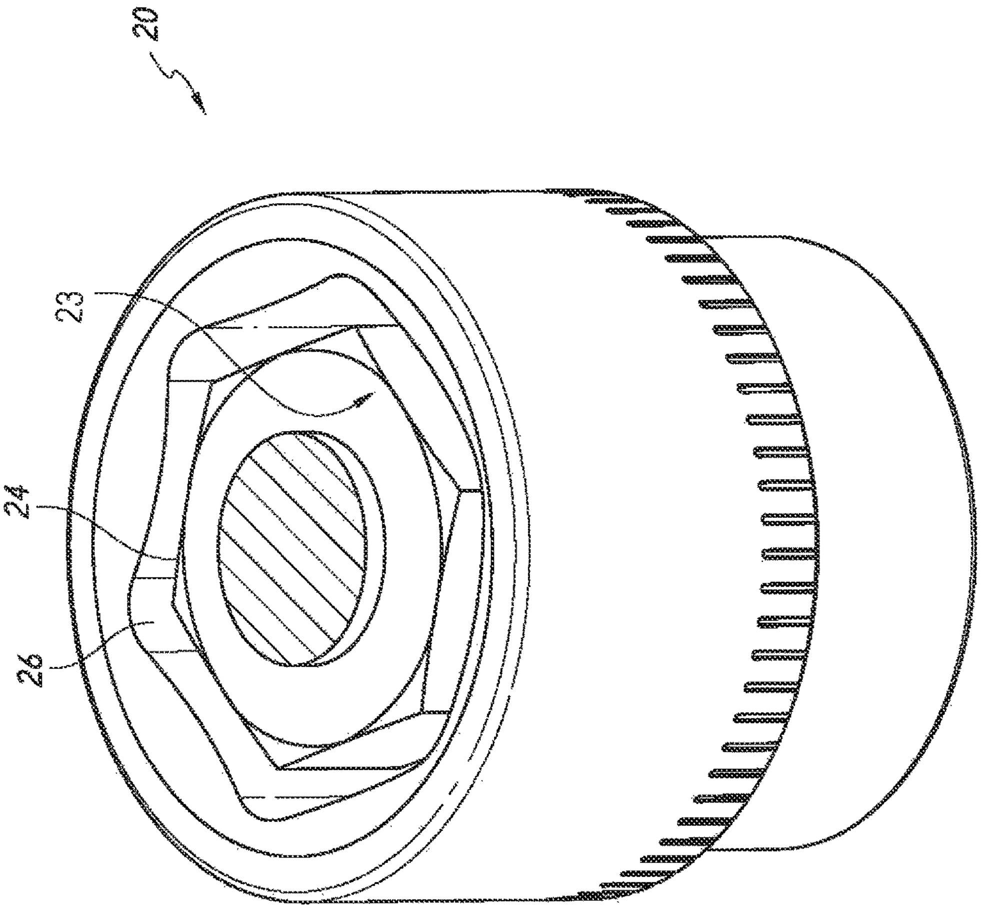
FIG. 2 (PRIOR ART)
FIG. 2 is a perspective view, showing a prior art socket.

10 wrench
11 bolt
12 handle
14 hole
16 head
18 adapter
20 socket
21 modified socket
20 ratcheting mechanism
23 interior surface
24 lobes
26 depressions
28 groove
30 grip socket device
32 rod member
34 locking tool
36 grip pad
38 break
40 gripping surface
42 outer surface
44 series of teeth

DETAILED DESCRIPTION OF THE INVENTION

Figure 3:
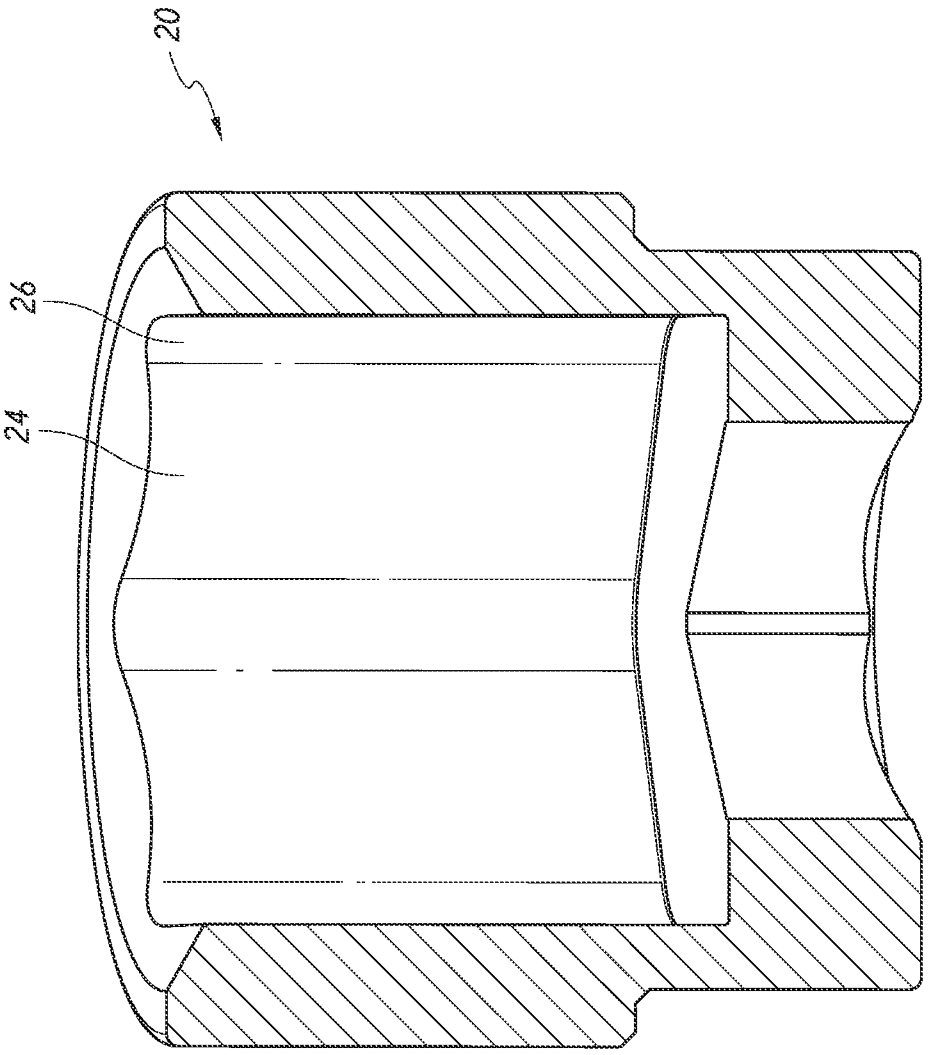
FIG. 3 (PRIOR ART)
FIG. 3 is a section view, showing a prior art socket.
Figure 4:
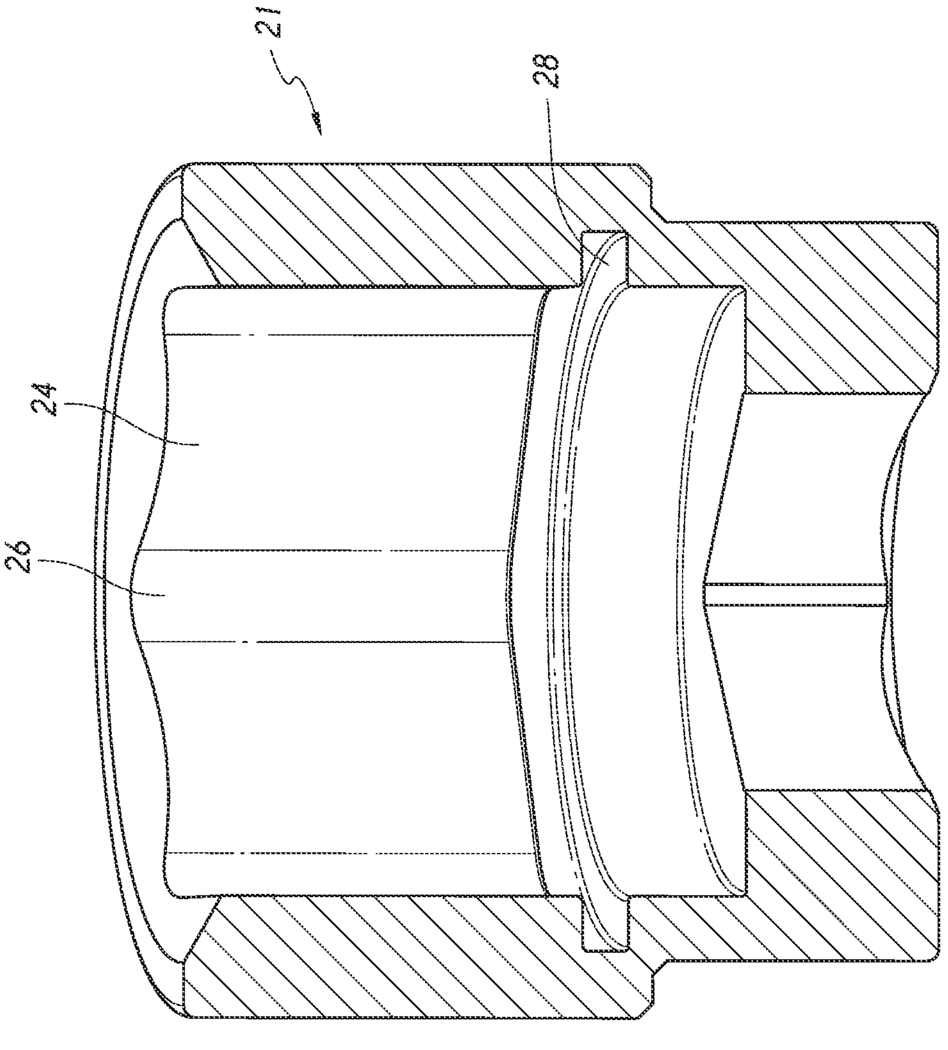
FIG. 4 is a perspective view, showing the present socket for the present grip socket device.

A section view of modified socket 21 is illustrated in FIG. 4. Modified socket 21 includes all of the features of prior art socket illustrated in FIG. 3, but also includes groove 28 which extends fully around and is carved into inner surface of modified socket 21. Groove 28 is formed at the base of depressions 26.

Figure 5:
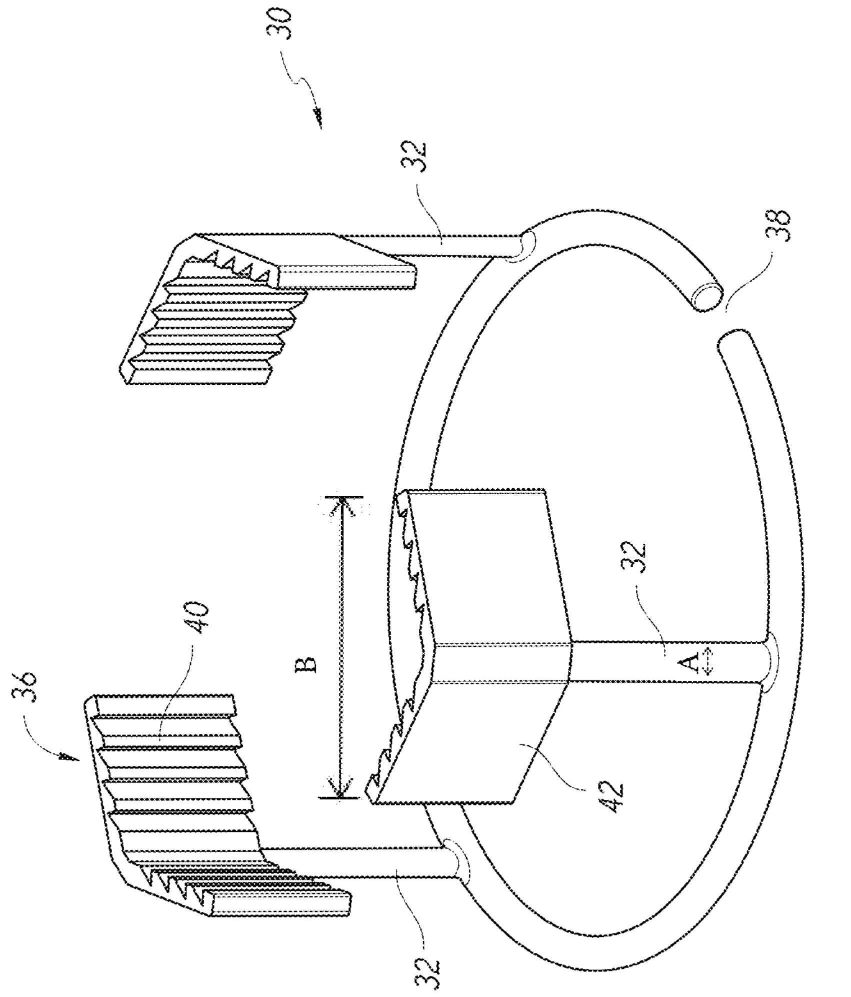
FIG. 5 is a perspective view, showing grip socket device.

FIG. 5 illustrates grip socket device 30 in one embodiment. Grip socket device 30 includes locking tool 34, a series of rod members 32, having a width (represented by reference numeral A) and grip pad 36, having a width (represented by reference numeral B). The width of each rod member 32 are less than half of the width of each grip pad 36. Locking tool 34 has a break 38, which enables the diameter of locking tool 34 to expand and contract. A series of rod members 32 extend upward from locking tool 34. For purposes of this disclosure, upward specifically refers to the orientation of rod members 32 in FIG. 5 and should not be interpreted as having any meaning with respect to the orientation of rod member 32 while in use.

One end of rod members 32 is attached to locking tool 34 and another end of rod members 32 include grip pad 36. Rod members 32 can be completely integrated with locking tool 34 such that locking tool 34 and rod members 32 are one integrated piece. Although three grip pads 36 are shown in the present embodiment, any number of grip pads 36 can be used to achieve the results described herein. Three or six grip pads 36 present the most uniform gripping surface when socket 30 is hexagonal.

Figure 6:
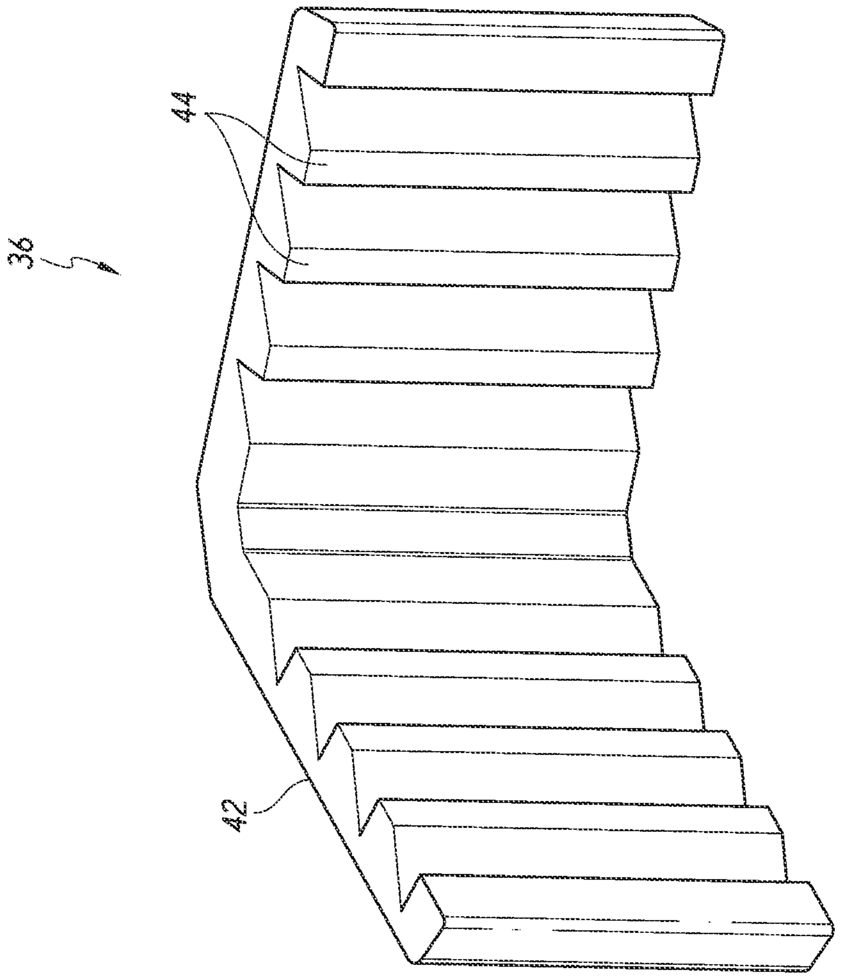
FIG. 6 is an expanded view, showing grip pad which attaches to rod member on grip socket device.

An expanded view of grip pad 36 is illustrated in FIG. 6. Grip pad 36 includes two surfaces, gripping surface 40 and outer surface 42. Gripping surface 40 can be made up of a series of teeth 44 that enhance the surface's frictional engagement with another object, such as a prior art bolt. Series of teeth 44 on gripping surface 40 rise away from the flat surface to increase engagement with an object such as a bolt or nut. Outer surface 42, opposite grip surface 40, is preferably smooth and capable of sliding, to some degree, along the interior surface of a modified socket 21, as described herein.

Figure 7:
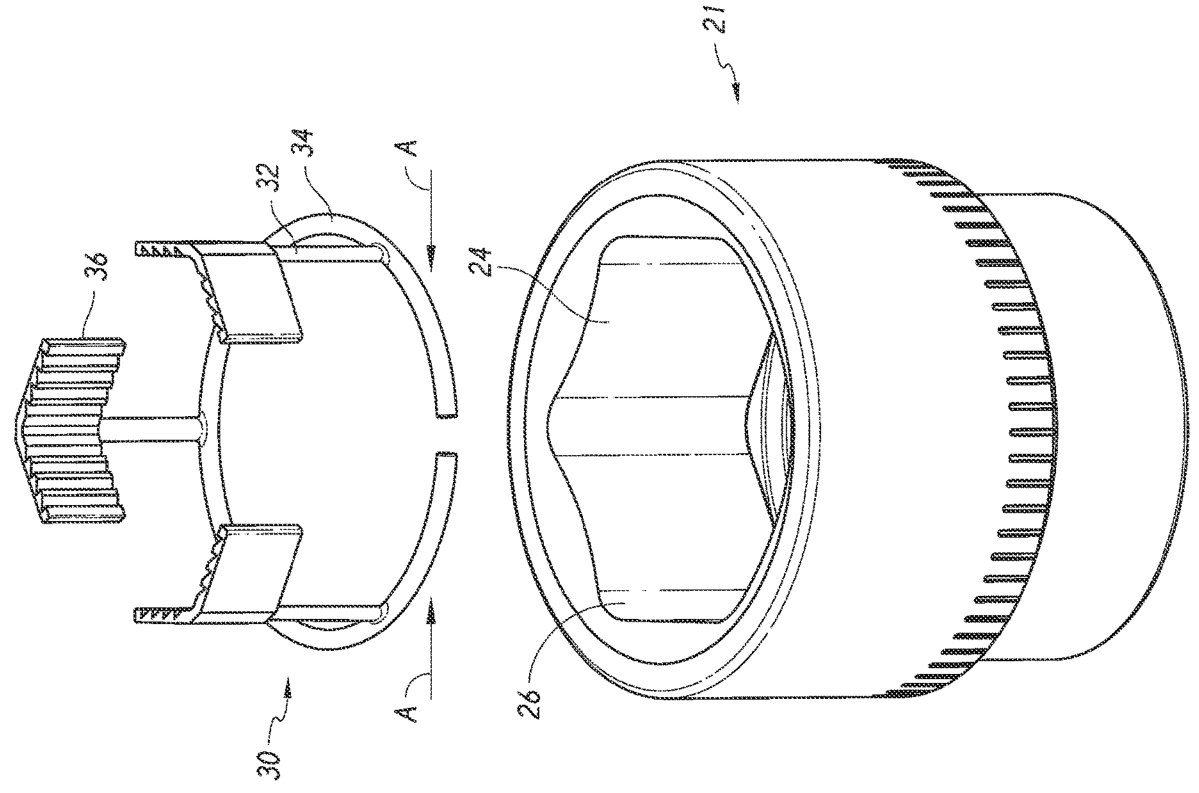
FIG. 7 is a perspective view, showing the installation of grip socket device into a modified socket.
Figure 8:
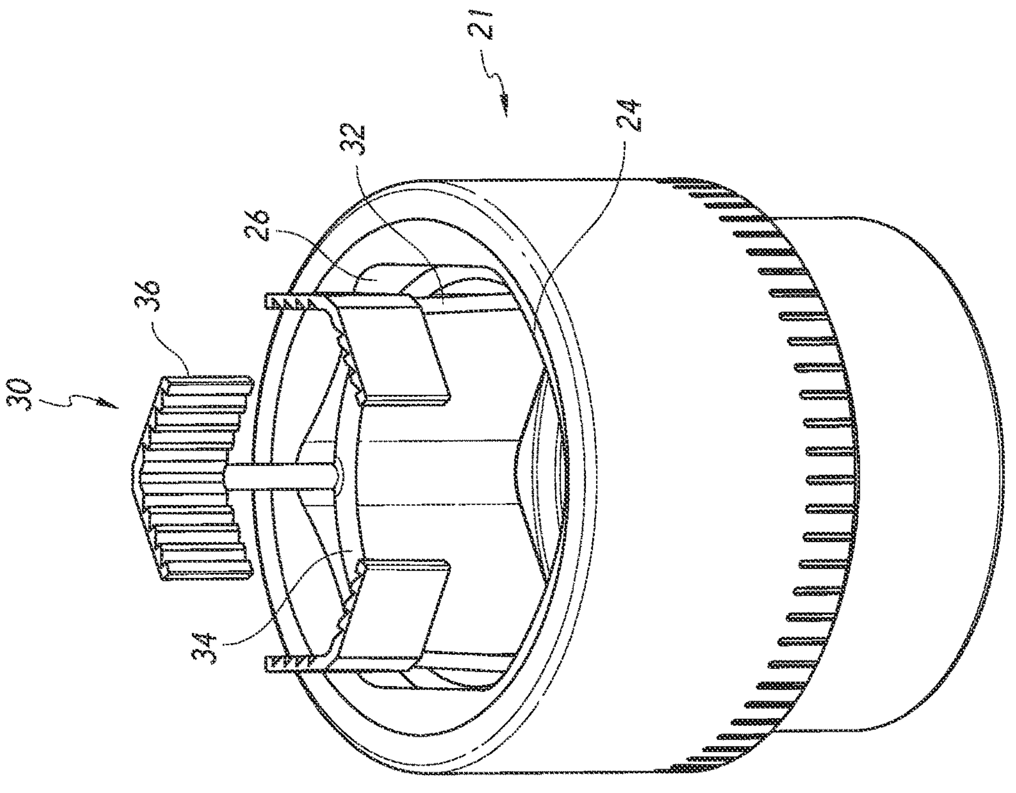
FIG. 8 is a perspective view, showing the installation of grip socket device into a modified socket.
Figure 9:
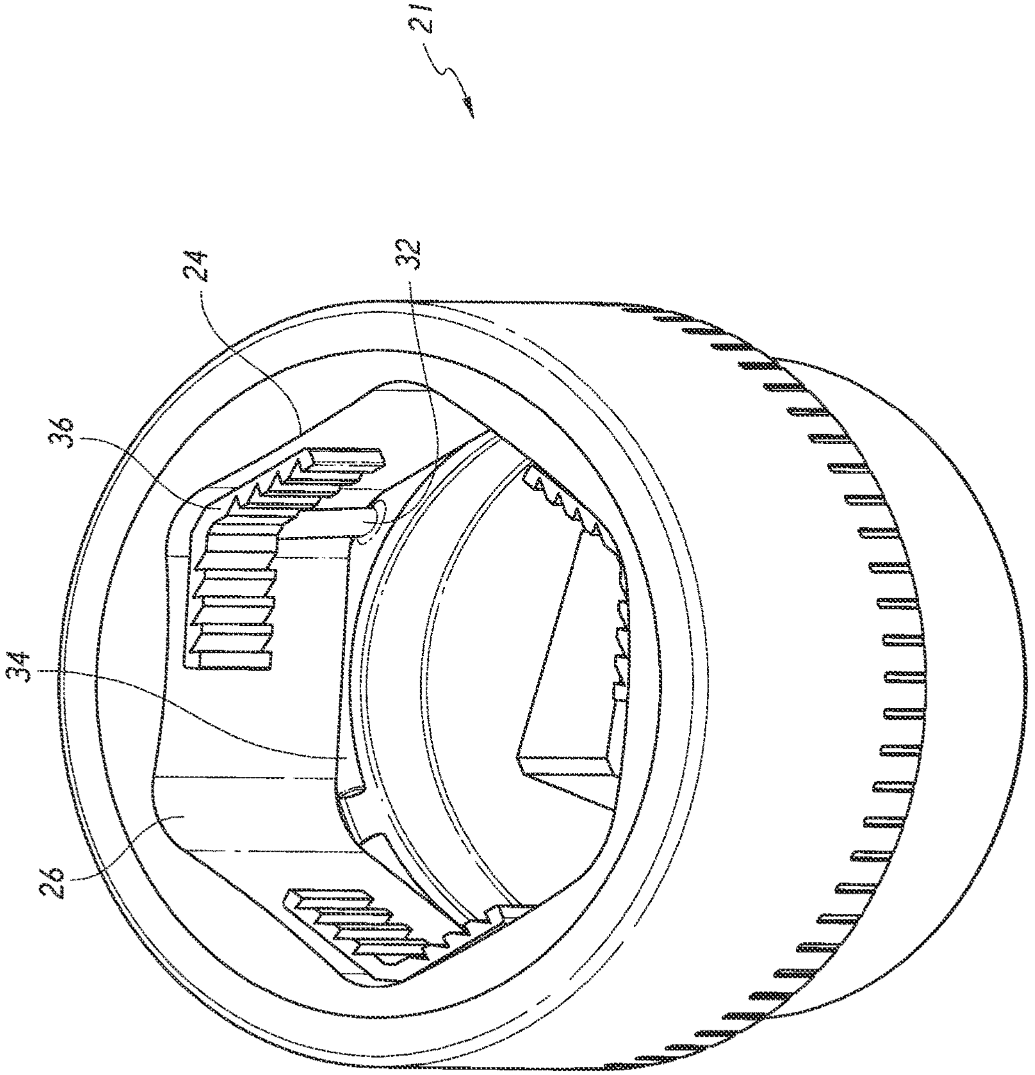
FIG. 9 is a perspective view, showing the grip socket device fully installed into a modified socket.

The method of installing grip socket device 30 into modified socket 21 is illustrated in FIGS. 7-9, Turning to FIG. 7, a user pushes inward on locking tool 34 (as shown with arrows A), which naturally reduces the first diameter of locking tool 34 to a second diameter (in a contracted state). Once contracted, the user can slide grip socket device 30 into modified socket 21. Locking tool 34 will expand somewhat to contact lobes 24 of modified socket 21, as illustrated in FIG. 8. At this time, user can align rod members 32 with depressions 26 on interior surface of modified socket 21 and push grip socket device 30 further into modified socket 21. When locking tool 34 reaches groove (shown in FIG. 4, reference numeral 28), locking tool 34 will expand further, securing locking tool 34 in groove, returning to its first diameter in the locking tool's 34 relaxed state. At this time, user can align outer surface 42 of grip pad 36 to interior surface 23 of socket 20, as shown in FIG. 9. Grip pad 36 will be oriented with central region of grip pad 36 aligned with depressions 26 of socket 10 such that gripping surface 40 is ready and capable of engaging with an object inserted into modified socket 21.

Figure 10:
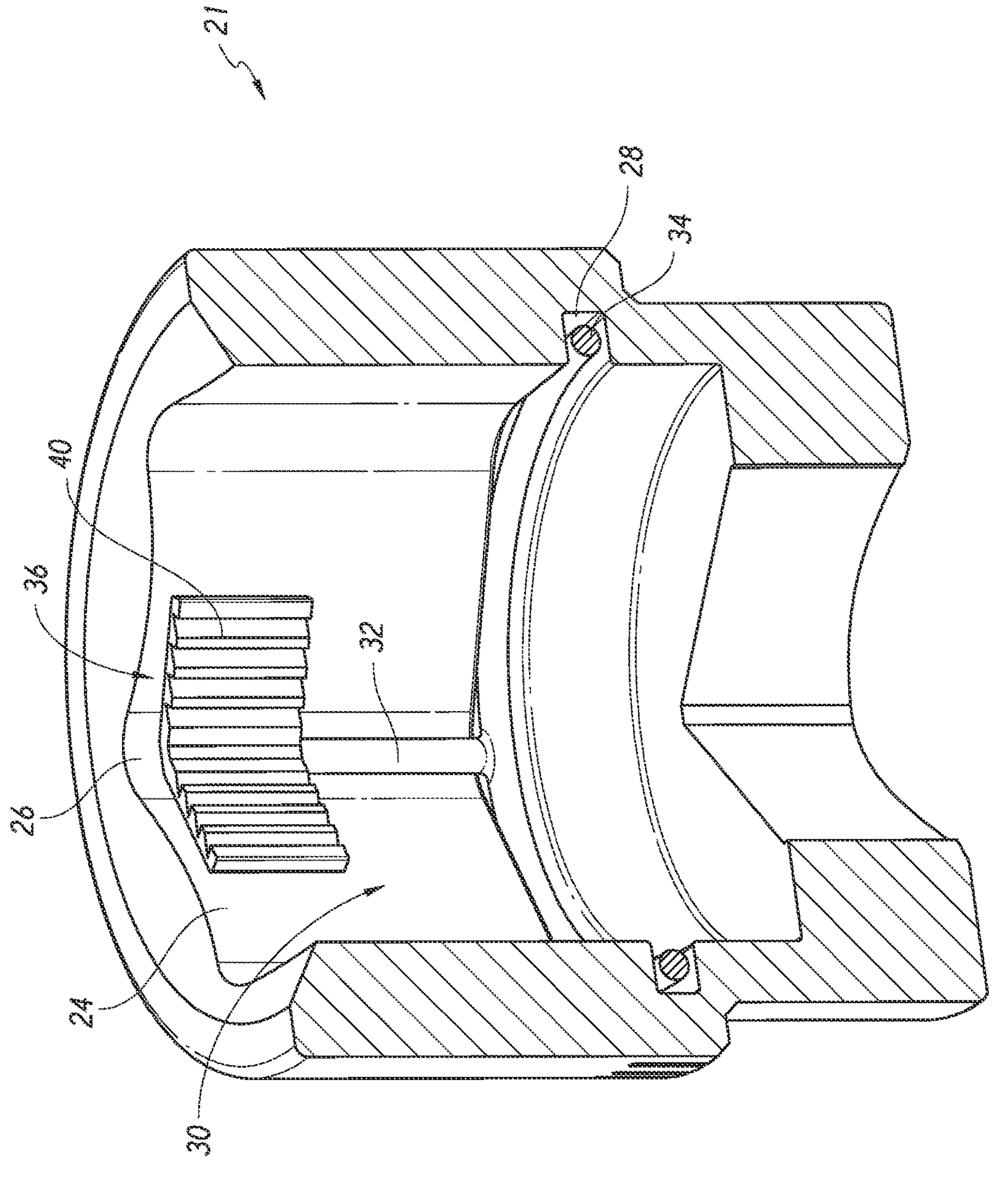
FIG. 10 is a section view, showing grip socket device installed in modified socket.

A section view of grip socket device 30 is shown installed in modified socket 21 in FIG. 10. For purposes of clarity, FIG. 10 is a section view to illustrate how grip socket device 30 fits into modified socket 21. Locking tool 34 fits into groove 28 of modified socket 21, rod members 32 fit into depressions 26 along interior surface of modified socket 21. Outer surface (shown in FIG. 5) of grip pads 36 contact lobes 24 and rests at the increased angle of lobe 24, which curves outward from depressions 26. Gripping surface 40 faces the interior of modified socket 21, such that gripping surface 40 is prepared to engage with an object, such as a nut or bolt, that will be inserted into modified socket 21.

Figure 11:
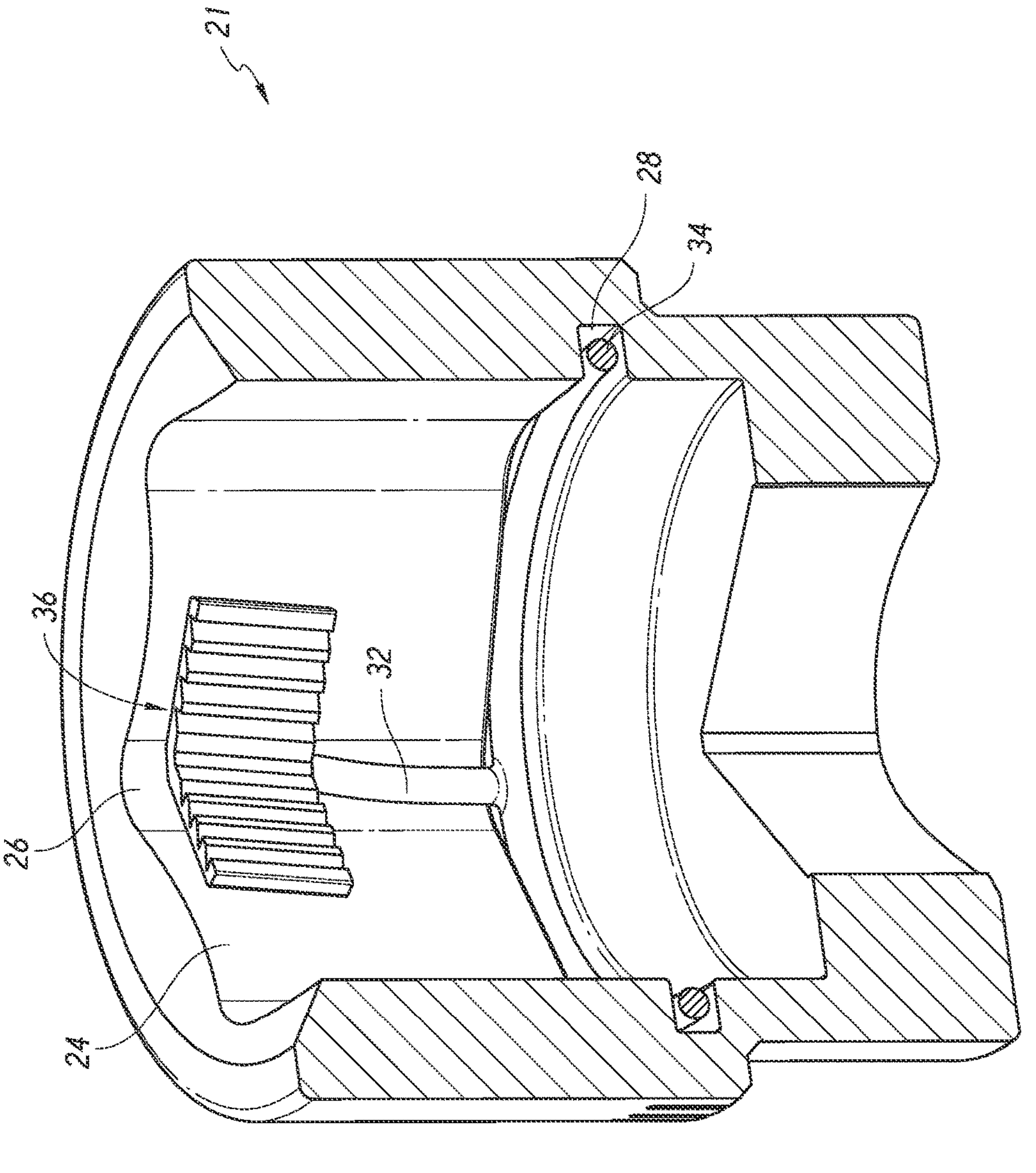
FIG. 11 is a section view, showing grip socket device installed in modified socket.
Figure 12:
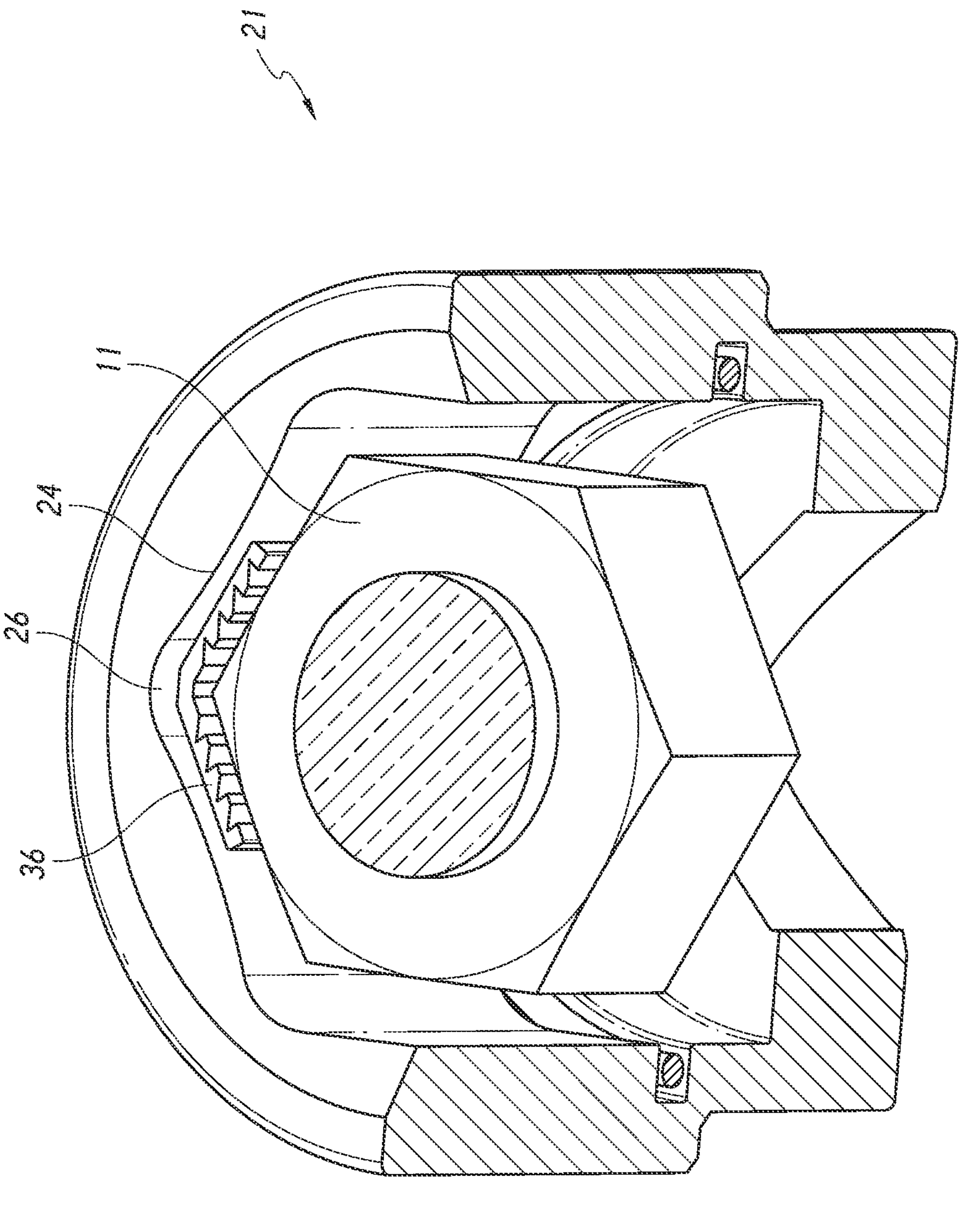
FIG. 12 is an exploded view, showing a prior art bolt engaging with grip socket device.
Figure 13:
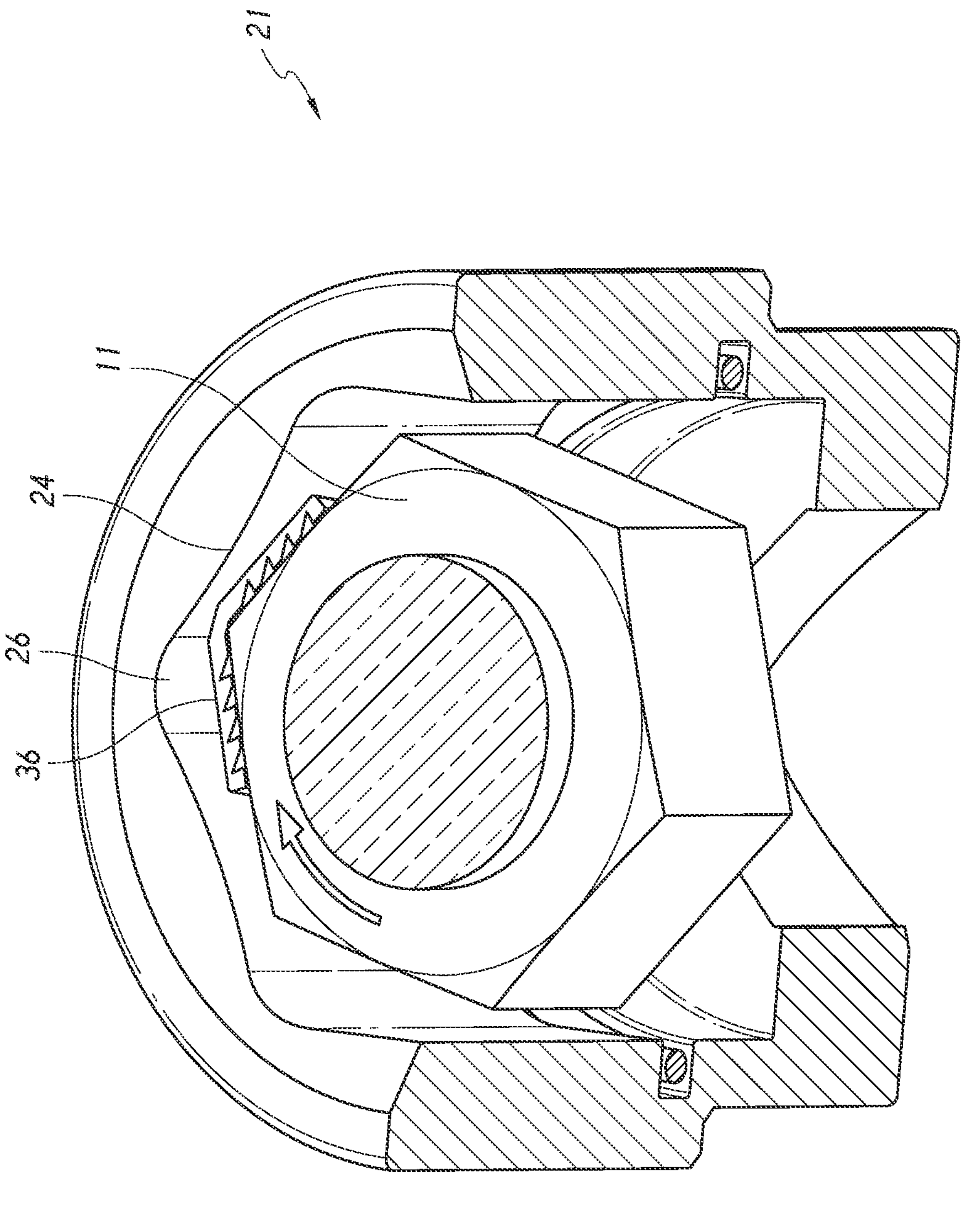
FIG. 13 is an exploded view, showing a prior art bolt engaging with grip socket device.

FIG. 11 is a section view that illustrates how rod members 32 can bend to assist with engagement of grip pad 36 with object, such as a nut or bolt (shown in FIG. 12). Rod members 32 flex slightly when the user applies rotational force (torque) on the object by turning the wrench. The slight flex of rod members 32 allows grip pad 36 to grip object more securely, as illustrated in FIGS. 12-13. For purposes of this disclosure the term "somewhat flexible" means that the rod member 32 are rigid enough to support the grip pad 32 securely in place when no force is applied and to flex slightly when a rotational force is applied.

FIG. 12 illustrates object 11 which represents the shape of a bolt (but for purposes of the illustration does not include threaded circular member, which would extend toward the reader in the illustrations). The method of using the grip socket device 30 and modified socket 21 includes the installation as well as the use as set out in this paragraph. Object 11 is placed within modified socket 21 and engages with grip pads 36. The initial engagement will likely have some room for movement between object 11 and grip pad 36, especially where the edges of object 11 are worn away, as is sometimes the case with a stripped nut or bolt. As the user applies rotational force to the wrench, modified socket 21 turns, which increases the engagement between object 11 and grip pad 36, as shown in FIG. 13. The reader will appreciate that as object 11 turns within modified socket 21, the outer surface 42 of grip pad 36 increases its engagement with lobes 24 as grip pad 36 moves higher along lobes 24 curve. Object 11 therefore increases its engagement with gripping surface 40 (series of teeth 44). It is in this manner that object 11 is prevented from turning freely within modified socket 21 which often occurs in prior art sockets where object is worn away at its edges or stripped.

The preceding description contains significant detail regarding the novel aspects of the present invention. It should not be construed, however, as limiting the scope of the invention but rather as providing illustrations of the preferred embodiments of the invention. As an example, there can be any number of rod members 32. Additionally, locking tool 34 may include a break 38 that is somewhat larger or very small in size. Thus, the scope of the invention should be fixed by the following claims, rather than by the examples given.

Having described my invention, I claim:

1. A grip socket device for use in connection with a modified socket having a series of lobes and depressions, and a groove, to grip an object, said device comprising:

a locking tool having a break, wherein said locking tool fits into and engages with said modified socket, a series of rod members having a first end and a second end and a width, wherein said first end of said series of rod members is connected to said locking tool, and wherein said series of rod members extend away from said locking tool in one direction, wherein said series of rod members occupy only a portion of said series of depressions on said modified socket, a grip pad having a width, connected to said second end of said series of rod members, wherein said grip pad of frictionally engages with said object;

wherein said width of said rod member is less than half of said width of said grip pad; and wherein said series of rod members flex within said depression such that a portion of said grip pad can exit said series of depressions and contact said series of lobes.

2. The grip socket device as recited in claim 1, wherein said locking tool has a first diameter in a relaxed state and a second diameter in a contracted state, wherein said second diameter is smaller than said first diameter.

3. The grip socket device as recited in claim 1, wherein said grip pad has a gripping surface and an outer surface.

4. The grip socket device as recited in claim 3, wherein said gripping surface of said grip pad has a series of teeth.

5. The grip socket device as recited in claim 4, wherein said series of rod members is three rod members.

6. The grip socket device as recited in claim 3, wherein said outer surface of said grip pad is smooth.

7. The grip socket device as recited in claim 1, wherein said series of rod members fit into said series of depressions on said modified socket.

8. The grip socket device as recited in claim 1, wherein said locking tool engages with said groove in said modified socket.

9. A method of gripping an object, comprising:
providing a modified socket having at least three lobes, at least three depressions and a groove,
providing a grip socket device having
a locking tool having a diameter, wherein said locking tool engages with said modified socket,
at least three rod members having a width, at least three first ends connected to said locking tool and at least three second ends connected to at least three grip pads,
wherein said at least three grip pads each have a width greater than half said width of said at least three rod members, and
wherein said at least three rod members of said grip socket device flex within said series of depressions during said step of turning said modified socket so that at least a portion of said at least three grip pads exit said series of depressions,
engaging said object in said modified socket such that said object contacts said at least three grip pads having a width, and
turning said modified socket such that said at least three grip pads further engages with said object.

10. The method of gripping an object as recited in claim 9, wherein said at least three rod members only occupy a portion of said at least three depressions on said modified socket.

11. The method of gripping an object as recited in claim 9, wherein said at least three grip pads of said socket device each have an outer surface and a gripping surface, wherein said gripping surface has a series of teeth.

12. The method of gripping an object as recited in claim 11, wherein said outer surface of said at least three grip pads is smooth.

13. The method of gripping an object as recited in claim 12, wherein when said object is turned in said modified socket, said at least three rod members flex to securely grip said object to prevent said object from slipping out of said at least three grip pads, and said outer surface of said at least three grip pads frictionally engage with each of said at least three lobes.

14. The method of gripping an object as recited in claim 9, further comprising the step of engaging said grip socket device with said modified socket by applying a force on said locking tool to reduce said diameter of said locking tool to fit said locking tool into said groove of said modified socket, and aligning said at least three rod members with said at least three depressions of said modified socket.

* * * * *